(12) United States Patent
Pan et al.

(10) Patent No.: US 12,510,706 B2
(45) Date of Patent: Dec. 30, 2025

(54) OPTICAL MODULE

(71) Applicant: Lextar Electronics Corporation, Hsinchu (TW)

(72) Inventors: Jia-Jie Pan, Hsinchu (TW); Wei-Yi Hsu, Hsinchu (TW); Jung-Tang Chu, Hsinchu (TW); Ming-Jing Lee, Hsinchu (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 18/893,276

(22) Filed: Sep. 23, 2024

(65) Prior Publication Data

US 2025/0102725 A1    Mar. 27, 2025

Related U.S. Application Data

(60) Provisional application No. 63/585,246, filed on Sep. 26, 2023.

(30) Foreign Application Priority Data

Sep. 5, 2024    (TW) .................................. 113133599

(51) Int. Cl.
    *F21V 8/00*    (2006.01)

(52) U.S. Cl.
    CPC ........... *G02B 6/0078* (2013.01); *G02B 6/004* (2013.01); *G02B 6/0068* (2013.01); *G02B 6/0073* (2013.01)

(58) Field of Classification Search
    CPC ...... F21V 7/0083; F21V 7/0066; F21V 7/048; F21Y 2105/16; F21Y 2105/18; G02B 6/0078; G02B 6/004; G02B 6/0068; G02B 6/0073; G02B 19/0019; G02B 5/09; G02B 19/0066; G02F 1/133602; G02F 1/133611;
    (Continued)

(56) References Cited

U.S. PATENT DOCUMENTS

| 2008/0157009 A1* | 7/2008 | Wittenberg ....... G02F 1/133615 250/494.1 |
| 2012/0032926 A1* | 2/2012 | Douxchamps ........ G06F 3/0425 345/175 |
| 2024/0360980 A1* | 10/2024 | Nara ..................... F21V 7/0066 |

FOREIGN PATENT DOCUMENTS

| CN | 102411165 B | * 8/2013 | ........... B29C 43/305 |
| CN | 104488257 A | 4/2015 |

(Continued)

OTHER PUBLICATIONS

Chinese language office action dated May 7, 2025, issued in application No. TW 113133599.

*Primary Examiner* — Fatima N Farokhrooz

(74) *Attorney, Agent, or Firm* — McClure, Qualey & Rodack, LLP

(57) ABSTRACT

The present pertains to an optical module including an optical shell, a plurality of first light-emitting diodes, a plurality of light guide plates, and a plurality of second light-emitting diodes. The optical shell includes a plurality of recessed portions and a flat portion surrounding the recessed portions. One of the first light-emitting diodes is disposed in the recessed portions. Each of the light guide plates has a top surface and a sidewall, and the top surface of the light guide plate is substantially at the same level as the flat portion of the optical shell. One of the second light-emitting diodes is disposed below the top surface of the light guide plates and is adjacent to the sidewall of the light guide plates.

20 Claims, 8 Drawing Sheets

(58) Field of Classification Search
CPC ......... G02F 1/133605; G02F 1/133606; G02F 1/133603
See application file for complete search history.

(56) References Cited

FOREIGN PATENT DOCUMENTS

| | | | | | |
|---|---|---|---|---|---|
| CN | 115220260 | A | * | 10/2022 | ....... G02F 1/133603 |
| JP | 2002184231 | A | * | 6/2002 | |
| JP | 2008034125 | A | * | 2/2008 | |
| JP | 2019139868 | A | * | 8/2019 | |
| TW | M351317 | U | | 2/2009 | |
| TW | I476350 | B | | 3/2015 | |
| WO | 2023276328 | A1 | | 1/2023 | |

\* cited by examiner

OPTICAL MODULE

CROSS REFERENCE TO RELATED APPLICATIONS

This Application claims priority of Taiwan Patent Application No. 113133599, filed on Sep. 5, 2024, and U.S. Provisional Application No. 63/585,246, filed on Sep. 26, 2023, the entireties of which are incorporated by reference herein.

BACKGROUND

Field of the Application

The disclosure relates to optical modules, and, in particular, to optical modules that include an optical shell in combination of light guide plates.

Description of the Related Art

Existing driver monitoring systems are composed of an additional monitoring device placed in the car, which takes more space and affects the consistency of the vehicle's interior layout. Therefore, existing vehicle devices still need further improvement in terms of integration.

SUMMARY

The present disclosure provides an optical module including an optical shell, a plurality of first light-emitting diodes, a plurality of light guide plates, and a plurality of second light-emitting diodes. The optical shell includes a plurality of recessed portions and a flat portion surrounding the recessed portions. One of the first light-emitting diodes is disposed in the recessed portions. Each of the light guide plates has a top surface and a sidewall, and the top surface of the light guide plates is substantially at the same level as the flat portion of the optical shell. One of the second light-emitting diodes is disposed below the top surface of the light guide plates and adjacent to the sidewall of the light guide plates.

BRIEF DESCRIPTION OF THE DRAWINGS

Aspects of the present disclosure are better understood from the following detailed description when read with the accompanying figures. It is worth noting that some features may not be drawn to scale in accordance with the standard practice in the industry. In fact, the dimensions of the various features may be arbitrarily increased or reduced for clarity of discussion. It is also emphasized that the drawings appended illustrate only typical embodiments of this disclosure and are therefore not to be considered limiting in scope, for the disclosure may apply equally well to other embodiments.

DETAILED DESCRIPTION

The existing driver monitoring systems require additional space outside of the vehicle panel display, which not only increases the cost in installation but also affects the consistency of the vehicle's interior layout. In order to integrate vehicle devices, the present disclosure provides an optical module that can incorporate the driver monitoring systems into the vehicle panel display, making it more convenient and improving the driving experience. For example, the optical module of the present disclosure can integrate an infrared (IR) light source used in driver monitoring systems into a direct-type backlight module used in the vehicle panel display. Then, the functional area of a vehicle panel display actively emits the IR light source which can be used for face monitoring. In addition, the optical module of the present disclosure includes a combination of an optical shell and light guide plates. The optical shell can precisely control the light emitted from the direct-type backlight module used in the display screen to optimize the display quantity of the panel display. Meanwhile, the light guide plates allow IR used in driver monitoring systems to be introduced laterally through and emitted evenly. In addition, through the design of the optical shell and light guide plates, the light source of the backlight module and the IR source can achieve non-interference with each other. Moreover, the light sources of the backlight module and the IR are at different levels, which allows effective thermal management.

Figure 1:
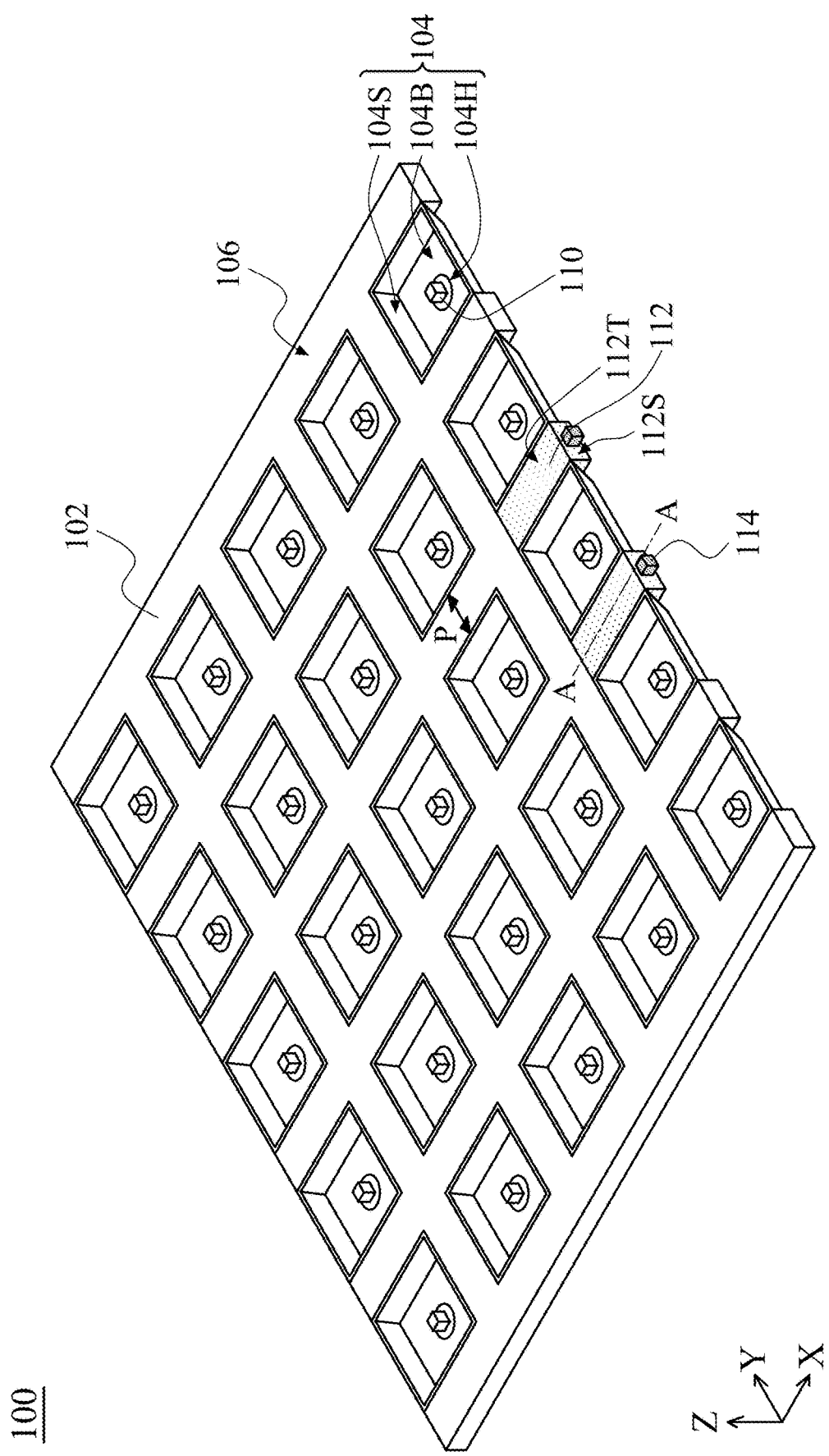
FIG. 1 is a three-dimensional view of an optical module, in accordance with some embodiments of the present disclosure.

FIG. 1 is a three-dimensional view of an optical module 100, in accordance with some embodiments of the present disclosure. As shown in FIG. 1, the optical module 100 of the present disclosure includes an optical shell 102, a plurality of first light-emitting diodes 110, a plurality of light guide plates 112, and a plurality of second light-emitting diodes 114. It should be noted that the structure of the optical module 100 is simplified and additional features such a substrate (not shown) for carrying electronic components (e.g., the first light-emitting diodes 110) and the like are omitted for the sake of simplicity. In some embodiments, the first light-emitting diodes 110 can be backlight sources and are arranged as an array within the optical shell 102. The first light-emitting diodes 110 may be sub-millimeter LEDs (mini-LEDs) or micro-LEDs, but the disclosure is not limited thereto.

In some embodiments, the optical shell 102 can reflect light emitted from the side surfaces of the first light-emitting diodes 110 (e.g., light emitted along the X-Y plane) in an upward direction from the optical shell 102. In some embodiments, the optical shell 102 may be formed from a resin material containing reflective particles (e.g., by stamping), where the reflective particles are metal oxides, such as titanium oxide, aluminum oxide, silicon oxide, and the like.

The resin materials may include epoxy resin, polyimide resin, bismaleimide triazine (BT) resin, polyphthalamide (PPA), polyethylene terephthalate (PET), and the like. In some other embodiments, resin materials that do not contain reflective particles may also be molded, and then reflective materials (e.g., a metal film of silver or aluminum) may be applied to the surface. The reflectivity of the optical shell 102 (or the reflective materials) for the light-emitting wavelength of the first light-emitting diodes 110 is greater than 98% (e.g., greater than 99%).

Specifically, in some embodiments, the optical shell 102 includes a plurality of recessed portions 104 and a flat portion 106 surrounding the recessed portions 104. The recessed portions 104 are cavities recessed downward from the top surface of the flat portion 106, and one of the first light-emitting diodes 110 is disposed within the recessed portions 104. The recessed portions 104 of the optical shell 102 can limit the light emitted from the first light-emitting diodes 110 to a specific viewing angle, allowing the light source to be more accurately controlled and improving light uniformity. Alternatively, in some special applications (e.g., local dimming), it can prevent the light in the bright areas from leaking into the dark areas (or non-bright areas), thereby reducing the contrast between the two areas. Further details will be discussed later.

In some embodiments, the spacing P between two adjacent recessed portions 104 (i.e., the width of the flat portion 106) may be appropriately adjusted according to design requirements, such as 0.1 to 100 mm. In general, when the spacing P of the recessed portions 104 is smaller, the quantity of recessed portions 104 can be increased while maintaining the same top view area of the optical shell 102. Consequently, the quantity of the first light-emitting diodes 110 that can be placed also increases. In some embodiments, the flat portion 106 may have a thickness in a range of 0.1 to 100 mm and a flat top surface, which can result in a thinner overall design for the optical shell 102. In FIG. 1, there are twenty-five (25) recessed portions 104 arranged in an array within the optical shell 102, which are provided merely as an example, and the present disclosure is not limited thereto. The quantity and arrangement of the recessed portions 104 can be adjusted according to the design requirements to accommodate the first light-emitting diodes 110.

In some embodiments, each of the recessed portions 104 of the optical shell 102 includes a bottom portion 104B and a plurality of inclined sidewalls 104S. The inclined sidewalls 104S surround the bottom portion 104B and connect the bottom portion 104B to the flat portion 106. The inclined sidewalls 104S can reflect light emitted from the side surfaces of the first light-emitting diodes 110 (e.g., light emitted along the X-Y plane) within the recessed portions 104 away from the recessed portions 104 in an upward direction (e.g., the Z direction) from the optical shell 102. Specifically, after the light emitted from the four side surfaces of the first light-emitting diodes 110 reaches the optical shell 102, it is reflected upward from the optical shell 102 by the inclined sidewalls 104S. This reflection allows the light source to be more accurately controlled and improves light uniformity.

As shown in FIG. 1, the recessed portions 104 may have a rectangular profile with a maximum width of 1 to 30 mm in a top view, with the bottom 104B also having a rectangle profile with a maximum width of 1 to 30 mm. The inclined sidewalls 104S may have an angle in a range of 1° to 90° with respect to the bottom 104B. Therefore, the recessed portions 104 may have a tapered profile in a cross-sectional view (e.g., in the X-Z plane). Such an arrangement helps to collimate the light, but the disclosure is not limited thereto. The profile and dimension of the recessed portions 104 in three-dimensional view can be adjusted according to design requirements.

In some embodiments, the bottom portion 104B has a hole 104H for disposing the first light-emitting diodes 110. The top view profile and dimension of the hole 104H in the top view are not limited to the circular profile shown in FIG. 1, as long as the entire first light-emitting diode 110 can be accommodated therein. In embodiments where the hole 104H has circular profile, the diameter of the hole 104H may, for example, be 0.1 to 10 mm.

Figure 6:
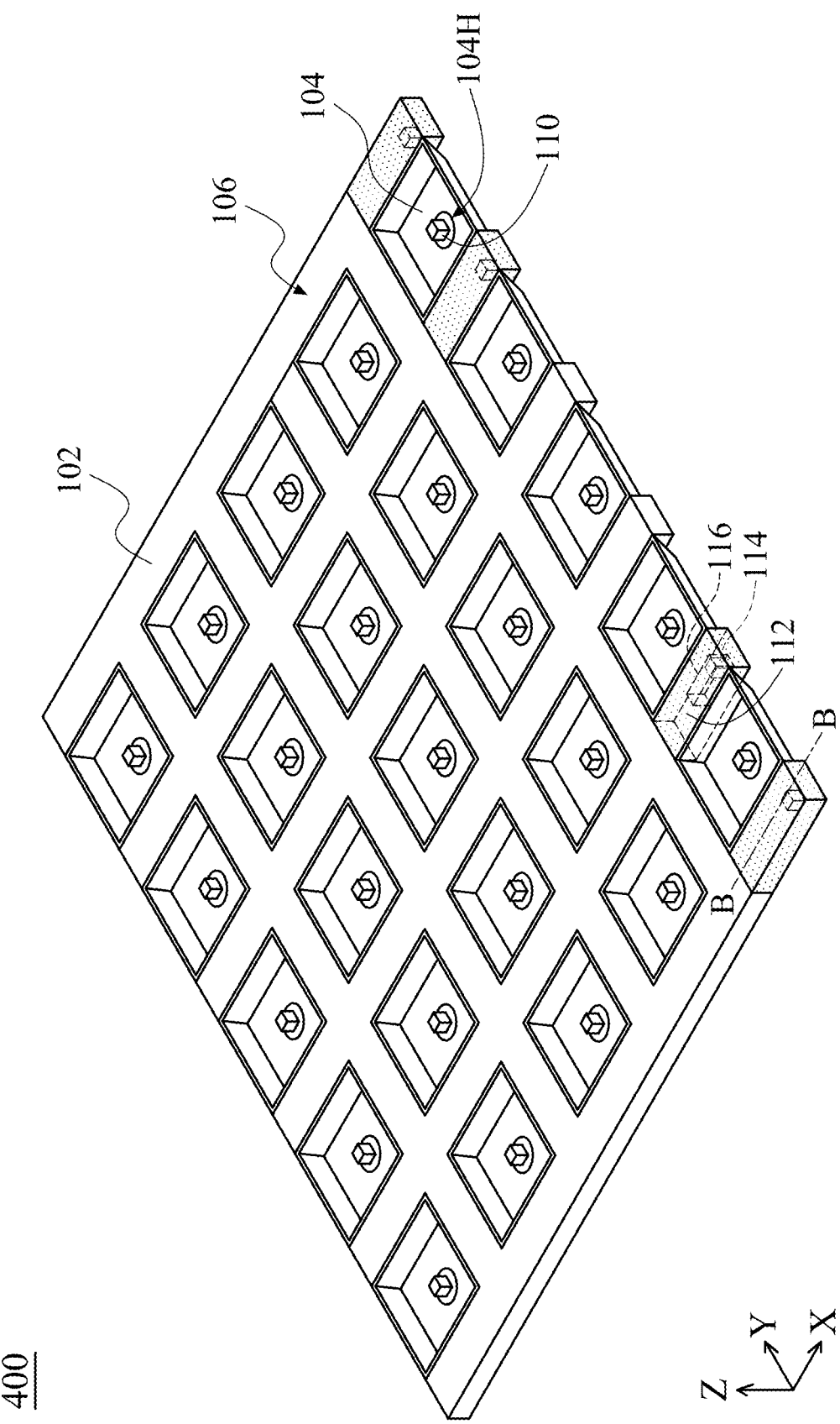
FIG. 6 is a three-dimensional view of an optical module in which second light-emitting diodes are located within an accommodation area in accordance with yet further embodiments of the present disclosure.

Still referring to FIG. 1, the optical module 100 of the present disclosure not only includes the first light-emitting diodes 110 used as a backlight source but also includes the second light-emitting diodes 114 used as a light source for the monitoring system. In this case, a plurality of light guide plates 112 are used to direct light emitted from the second light-emitting diodes 114. In some embodiments, each of the light guide plates 112 has a top surface 112T and a sidewall 112S, and the top surface 112T of the light guide plates 112 is substantially at the same level as the flat portion 106 of the optical shell 102. In other words, it can be regarded as replacing at least a portion of the flat portion 106 of the optical shell 102 with the light guide plates 112, ensuring that the top surfaces of both the light guide plates 112 and the flat portion 106 are co-planar. In some embodiments, the light guide plates 112 are disposed between adjacent recessed portions 104. As shown in the FIG. 1, two light guide plates 112 are respectively located on opposite sides of one of the recessed portions 104, but the present disclosure is not limited thereto. The quantity and arrangement of the light guide plates 112 can be configured according to design requirements (e.g., the desired illumination area). In the embodiments in which the second light-emitting diodes 114 are disposed on the sidewall 112S of the light guide plates 112, the sidewall 112S of one light guide plate 112 does not in direct contact with the recessed portions 104 or the flat portion 106. For example, as shown in FIG. 1, the sidewall 112S of the light guide plates 112 is co-planar with the edge of the optical shell 102. In other embodiments, the second light-emitting diodes 114 are not disposed on the sidewall 112S of the light guide plates 112 (e.g., as shown in FIG. 6), so the configuration of the light guide plates 112 is not limited to what is discussed above.

In some embodiments, the light guide plates 112 can direct light emitted from the second light-emitting diodes 114 in an upward direction (e.g., the Z direction) from the optical shell 102. The light guide plates 112 may have a flat top surface, which can result in a thinner overall design for the optical shell 102. The light guide plates 112 may have a thickness in a range of 0.1 to 30 mm, but the present disclosure is not limited thereto. The light guide plates 112 may have any thickness depending on how to optimize the light emission performance of the second light-emitting diodes 114. In some embodiments, the material of the light guide plates 112 may include polymethyl methacrylate (PMMA), methyl methacrylate polystyrene (MS), polycarbonate (PC), polystyrene (PS) or other suitable light-guiding material. The light guide plates 112 may be joined with the optical shell 102 by splicing.

In some embodiments, the second light-emitting diodes 114 may be sub-millimeter LEDs (mini-LEDs) or micro-LEDs, but the disclosure is not limited thereto. As shown in FIG. 1, the first light-emitting diodes 110 and the second light-emitting diodes 114 are at different levels (e.g., X-y plane, Y-Z plane or X-Z plane), which helps to avoid thermal concentration and achieve good thermal management.

Figure 2:
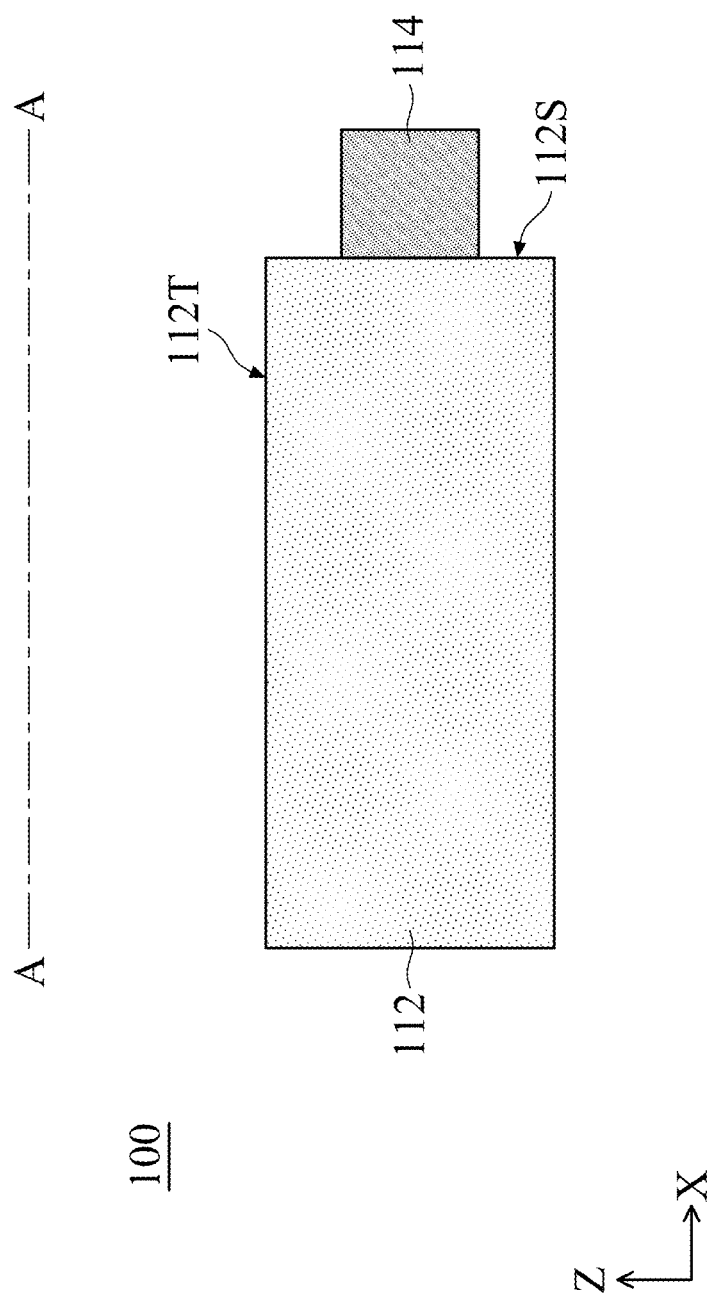
FIG. 2 is a cross-sectional view of the optical module of FIG. 1, taken along line A-A.

In some embodiments, the second light-emitting diodes 114 are disposed on the sidewall 112S of the light guide plates 112 and are not higher than the top surface 112T of the light guide plate 112s. In details, FIG. 2 is a cross-sectional view of the optical module 100 of FIG. 1 taken along line A-A. As shown in the figure, the second light-emitting diodes 114 are directly disposed on the sidewall 112S of the light guide plates 112, and the top surface of the second light-emitting diodes 114 is lower than the top surface 112T of the light guide plates 112. Although the second light-emitting diodes 114 are illustrated as being located at the midpoint of the thickness of the light guide plates 112, the present disclosure is not limited thereto. In other embodiments, the second light-emitting diodes 114 may be located at any level. For example, the top surface of the second light-emitting diodes 114 may be co-planar with the top surface of the light guide plates 112, which would position the second light-emitting diodes 114 further away from the first light-emitting diodes 110 in the Z direction, thereby further avoiding heat concentration. Alternatively, the bottom surface of the second light-emitting diodes 114 may be co-planar with the bottom surface of the light guide plates 112, which can be compatible with an off-axis infrared light emitter design.

Figure 3:
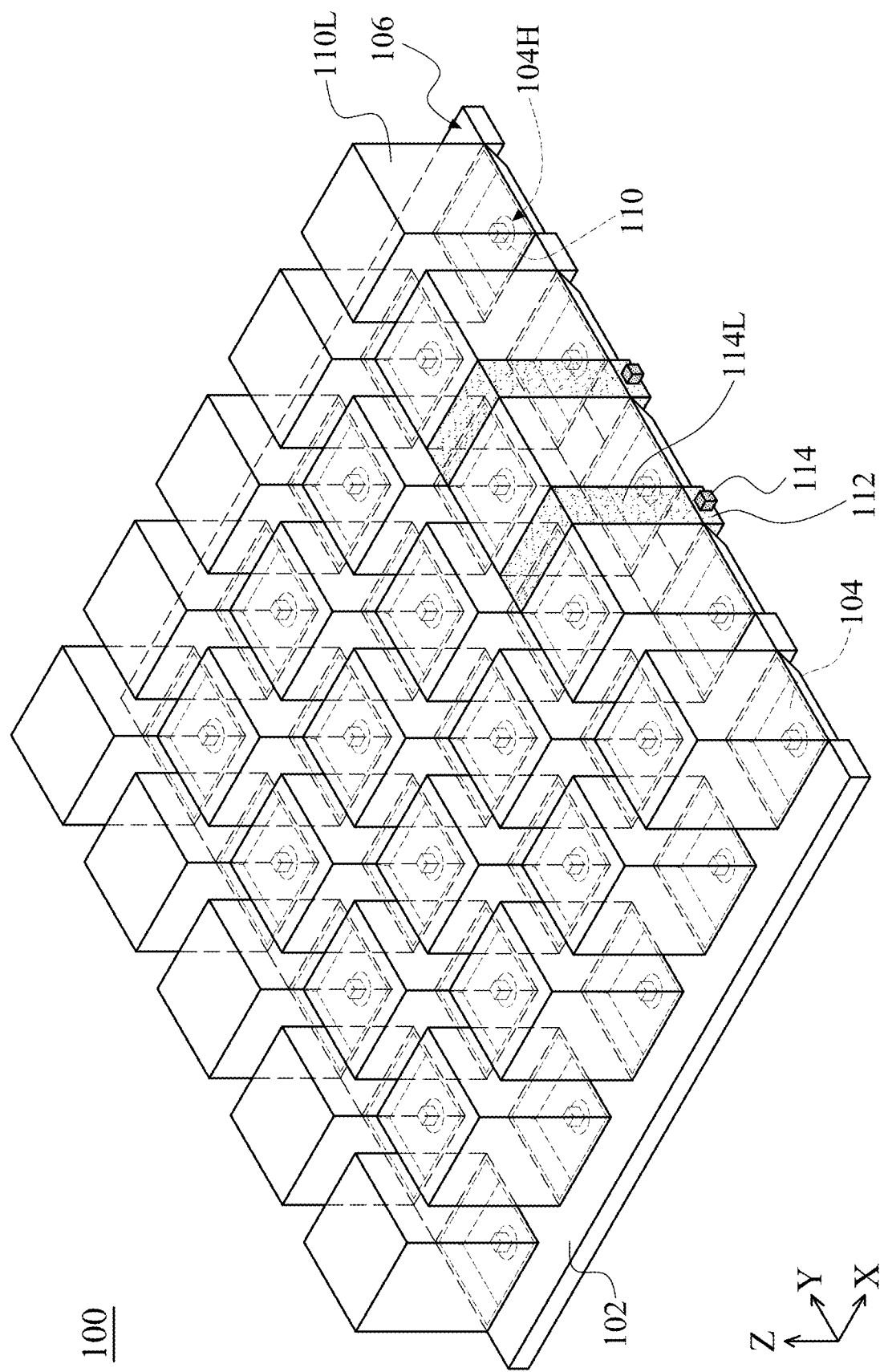
FIG. 3 is a three-dimensional view of an optical module during the first light-emitting diodes and the second light-emitting diodes emit light in accordance with some embodiments of the present disclosure.

FIG. 3 is a three-dimensional view of an optical module 100 during first light-emitting diodes 110 and second light-emitting diodes 114 emit light, in accordance with some embodiments of the present disclosure. As shown in the figure, the recessed portions 104 of the optical shell 102 can limit the light 110L emitted from the first light-emitting diodes 110 to a specific viewing angle (e.g., an area extending in the normal direction (i.e., the Z direction) of the flat portion 106) to achieve collimated light. The light 114L emitted from the second light-emitting diodes 114 is directed into the light guide plates 112 and is emitted evenly in an upward direction (e.g., the Z direction) from the optical shell 102. The areas of the light 110L emitted from the first light-emitting diodes 110 and the light 114L emitted from the second light-emitting diodes 114 in FIG. 3 is shown merely as an example, and the present disclosure is not limited thereto. The light 110L and the light 114L may continue to extend upward in the Z direction.

Through the design of a combination of the optical shell 102 and the light guide plates 112, the light 110L emitted from the first light-emitting diodes 110 and the light 114L emitted from the second light-emitting diodes 114 can achieve non-interference with each other in the normal direction (i.e., the Z direction) of the flat portion 106. In some embodiments, the first light-emitting diodes 110 and the second light-emitting diodes 114 emit light in different colors. For example, the first light-emitting diodes 110 emit blue light with a wavelength in a range of 380 to 500 nm, while the second light-emitting diodes 114 emit infrared light with a wavelength in a range of 750 to 1400 nm.

Some variations of the embodiments are described below. In the different drawings and illustrated embodiments, the same or similar reference numbers are used to designate the same or similar components.

Figure 4:
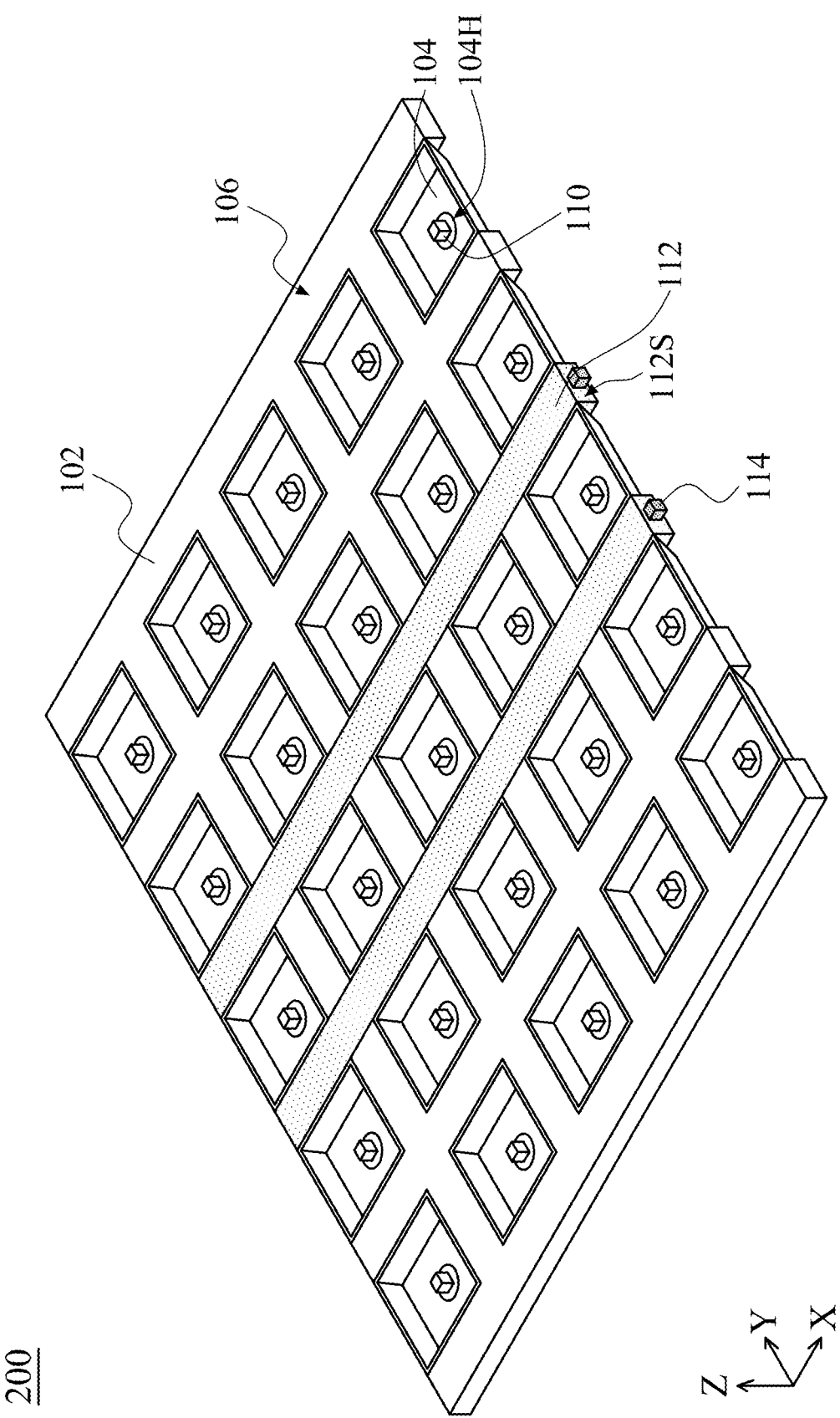
FIG. 4 is a three-dimensional view of an optical module in which light guide plates extend along one direction in accordance with some other embodiments of the present disclosure.
Figure 5:
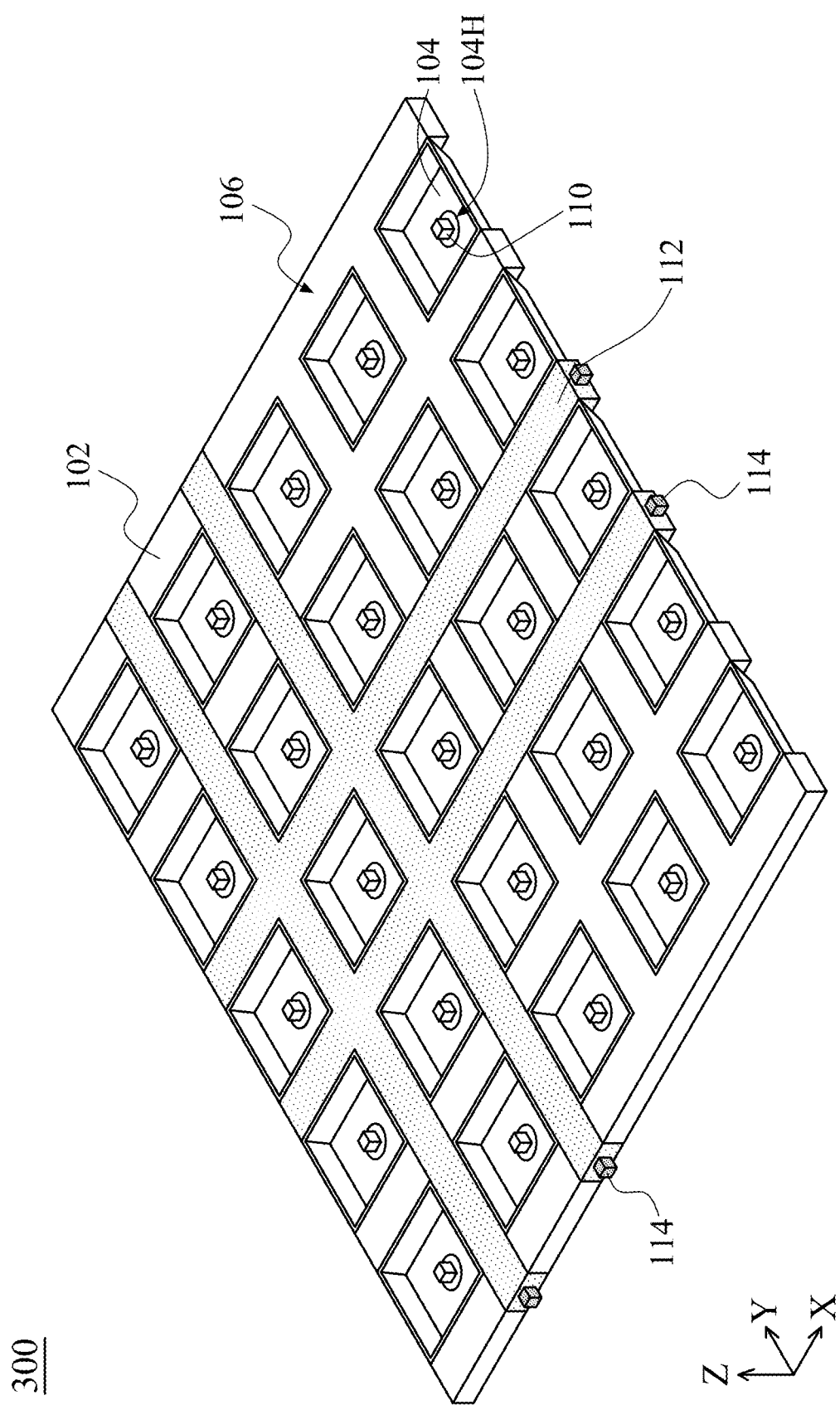
FIG. 5 is a three-dimensional view of an optical module in which light guide plates extend along two directions in accordance with some further embodiments of the present disclosure.

FIGS. 4-5 are three-dimensional views of optical modules 200 and 300, in accordance with some other embodiments of the present disclosure. The optical module 200 in FIG. 4 and the optical module 300 in FIG. 5 are similar to the optical module 100 in FIG. 1, except that the light guide plates 112 extend along one direction (FIG. 4) or two directions (FIG. 5) to the other sides of the optical module.

As shown in FIG. 4, the light guide plates 112 extend along the first direction X or the second direction Y (not shown) and are disposed between the pluralities of sets of recessed portions 104 to form a strip. Although the light guide plates 112 are illustrated as two strips extending along the X direction and located on both sides of a row of recessed portions 104, the present disclosure is not limited thereto.

As shown in FIG. 5, the light guide plates 112 extend not only along the first direction X but also along the second direction Y, which is different from the first direction X, to form a grid pattern, but the present disclosure is not limited thereto. The quantity, arrangement, or length of the light guide plates 112 can be configured in any direction according to design requirements (e.g., the desired illumination area). In embodiments where the light guide plates 112 extend from one edge of the optical shell 102 to the opposite edge, the second light-emitting diodes 114 are disposed on both sidewalls 112S of the light guide plates 112 to improve the light uniformity of the second light-emitting diodes 114.

Figure 7:
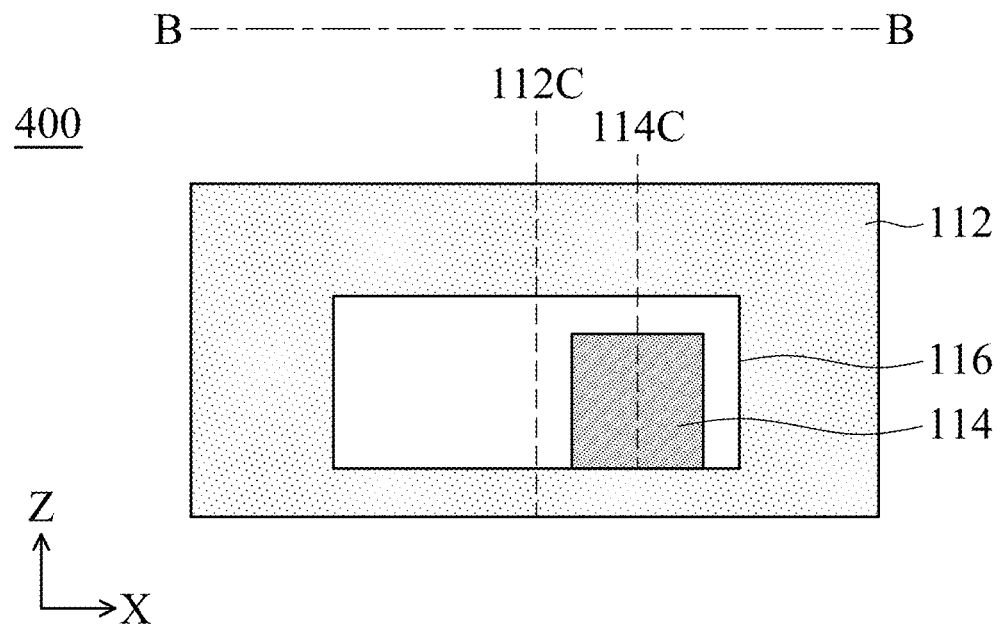
FIG. 7 is a cross-sectional view of the optical module of FIG. 6, taken along line B-B.

FIG. 6 is a three-dimensional view of an optical module 400 in accordance with yet further embodiments of the present disclosure. The optical module 400 in FIG. 6 is similar to the optical module 100 in FIG. 1, except that the second light-emitting diodes 114 are located within an accommodation area 116. In some embodiments, the second light emitting diodes 114 are disposed below the top surface 112T of the light guide plates 112 and adjacent to the sidewall 112S of the light guide plates 112. Specifically, each of the light guide plates 112 includes an accommodating area 116, and the second light-emitting diodes 114 are located within the accommodating area 116 rather than being disposed on the sidewall 112S of the light guide plates 112 (as shown in FIG. 2). The accommodating area 116 may have any dimension as long as it can accommodate the second light-emitting diodes 114. In details, FIG. 7 is a cross-sectional view of the optical module 400 of FIG. 6 taken along line B-B. As shown in the figure, the light guide plates 112 include an accommodating area 116, and the light guide plates 112 are located in the accommodating area 116. As a result, the optical module 400 can achieve off-axis light or various fields of view (FOV) by adjusting the position of the second light-emitting diodes 114. Specifically, in a cross-sectional view, the central axis 114C of the second light-emitting diodes 114 is offset from the central axis 112C of the light guide plates 112.

Figure 8:
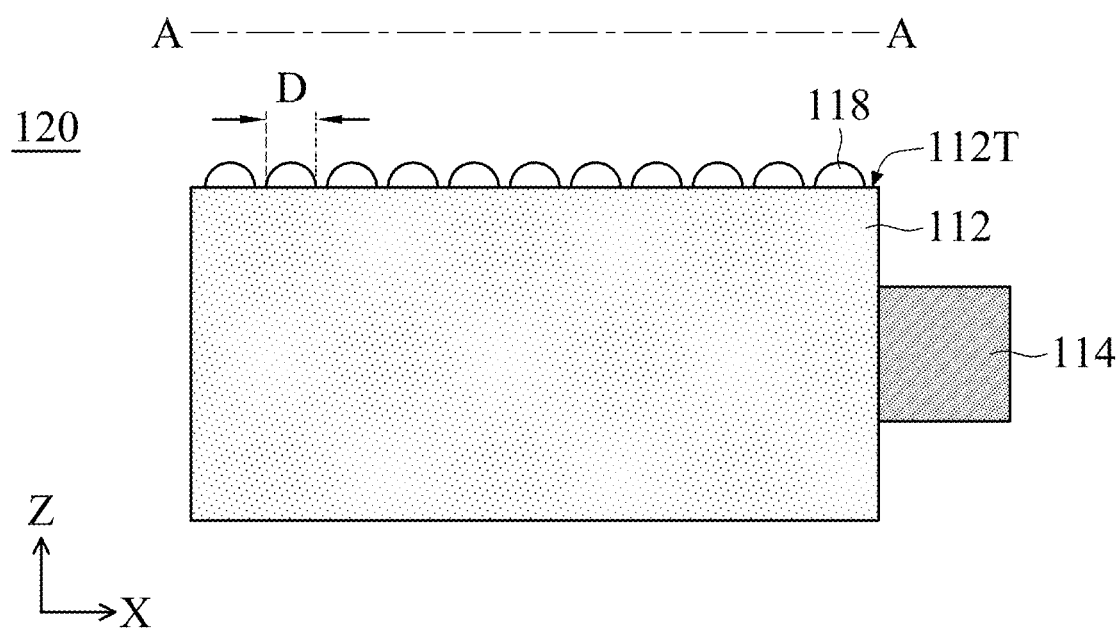
FIGS. 8-10 are cross-sectional views of an optical module in which the optical module further includes a plurality of dots in accordance with other embodiments of the present disclosure.
Figure 9:
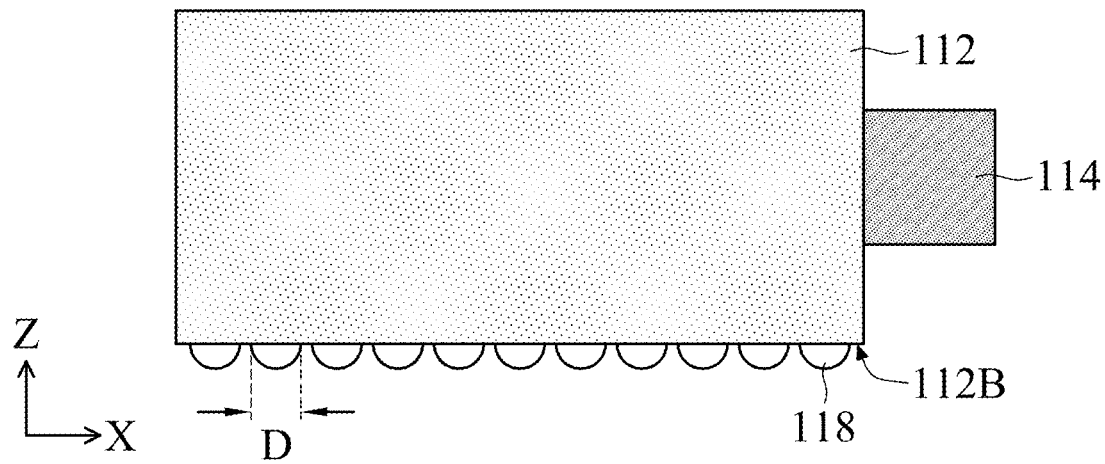
Figure 10:
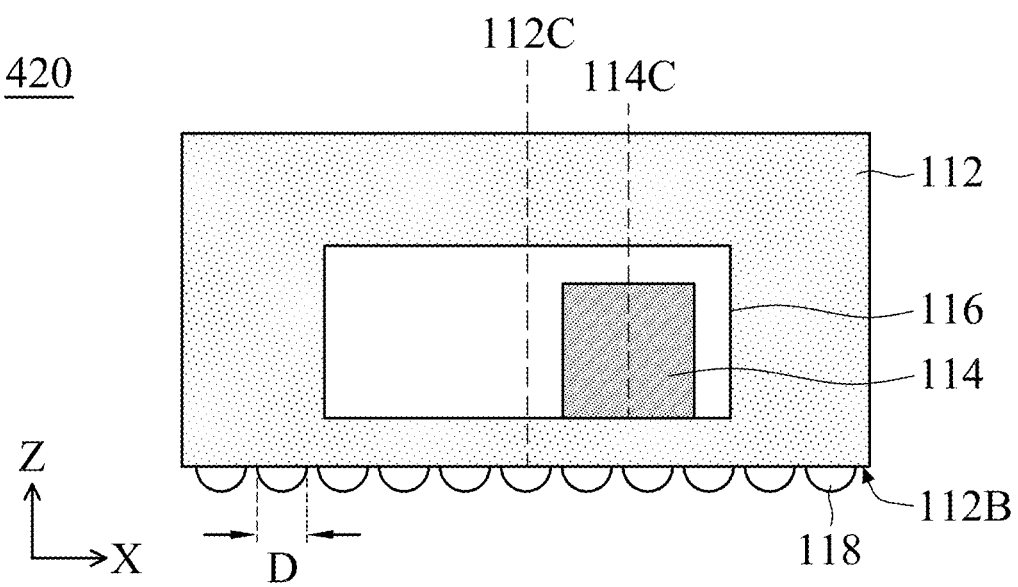

FIGS. 8-10 are cross-sectional views of optical modules 120, 140, and 420 in which the optical module 120, 140, and 420 further include a plurality of dots 118 in accordance with other embodiments of the present disclosure. The optical module 120 in FIG. 8 or the optical module 140 in FIG. 9 is similar to the optical module 100 in FIG. 2, and the difference is that the plurality of dots 118 is disposed on the top surface 112T (FIG. 8) or the bottom surface 112B (FIG. 9) of the light guide plates 112. In some embodiments, the dots 118 may be used to partially refract and partially reflect the light emitted from the second light-emitting diodes 114 to improve light uniformity. Each of the dots 108 has a diameter D in a range of 10 to 100 um, but the present disclosure is not limited thereto. The arrangement, profile, and dimension of the dots 118 can be adjusted according to the light emission characteristics of the second light-emitting diodes 114. The material of the dots 118 may, for example, be ultraviolet (UV) curable adhesive. The optical module 420 in FIG. 10 is similar to the optical module 400 in FIG. 7, except that there is a plurality of dots 118 disposed on the bottom surface 112B of the optical modules 112.

In summary, the present disclosure provides an optical module includes a combination of an optical shell and light guide plates. In one embodiment, the optical shell can control the light emitted from the first light-emitting diodes used in the direct-type backlight module of the display screen to improve light uniformity, while the light guide plates allow the second light-emitting diodes like IR used in the driver monitoring systems to be introduced laterally through and emitted evenly. In addition, through the design of the optical shell and light guide plates, the light source of the first and second light-emitting diodes can achieve non-interference with each other. Moreover, the light sources of the first and second light-emitting diodes are at different levels, which allows effective thermal management. As a result, the driver monitoring systems can be incorporated into the vehicle panel display, making it more convenient and improving the driving experience.

While the present disclosure has been described by way of example and in terms of the preferred embodiments, it should be understood that the present disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical module, comprising: an optical shell, comprising: a plurality of recessed portions; and a flat portion surrounding the recessed portions; a plurality of first light-emitting diodes, wherein one of the first light-emitting diodes is disposed in the recessed portions; a plurality of light guide plates, wherein each of the light guide plates has a top surface and a sidewall, and the top surface of the light guide plates is substantially at a same level as the flat portion of the optical shell; and a plurality of second light-emitting diodes, wherein one of the second light-emitting diodes is disposed below the top surface of the light guide plates and adjacent to the sidewall of the light guide plates; wherein each of the plurality of light quide plates is disposed between two adjacent ones of the recessed portions and wherein the light quide plates contact the side surface of the flat portion.

2. The optical module of claim 1, wherein the light guide plate is disposed between any adjacent ones of the recessed portions.

3. The optical module of claim 1, wherein the optical shell is configured to reflect light emitted from the side surface of the first light-emitting diodes away from the recessed portions in an upward direction from the optical shell.

4. The optical module of claim 1, wherein the second light-emitting diodes are disposed on the sidewall of the light guide plates, and the light guide plates are configured to direct light emitted from the second light-emitting diodes in an upward direction from the optical shell.

5. The optical module of claim 1, wherein the first light-emitting diodes and the second light-emitting diodes emit light in different colors.

6. The optical module of claim 5, wherein the first light-emitting diodes emit blue light with a wavelength in a range of 380 to 500 nm.

7. The optical module of claim 1, wherein each of the recessed portions of the optical shell comprises:
a bottom portion having a hole for disposing the first light-emitting diodes; and
a plurality of inclined sidewalls surrounding the bottom portion and connecting the bottom portion to the flat portion.

8. The optical module of claim 1, wherein each of the light guide plates comprises an accommodating area, and the second light-emitting diodes are located within the accommodating area.

9. The optical module of claim 1, wherein the light guide plates further comprise a plurality of dots disposed on a surface of the light guide plates adjacent to the second light-emitting diodes.

10. The optical module of claim 1, wherein the light guide plates further comprise a plurality of dots disposed on the top surface of the light guide plates.

11. The optical module of claim 1, wherein the light guide plates further comprise a plurality of dots disposed on a bottom surface of the light guide plates.

12. The optical module of claim 1, wherein the first light-emitting diodes and the second light-emitting diodes are at different levels.

13. The optical module of claim 1, wherein the recessed portions are arranged in an array within the optical shell.

14. The optical module of claim 1, wherein light emitted from the first light-emitting diodes and light emitted from the second light-emitting diodes do not interfere with each other along a normal direction of the flat portion.

15. The optical module of claim 1, wherein the light guide plates have a thickness in a range of 0.1 to 30 mm.

16. The optical module of claim 1, wherein a reflectivity of the optical shell for a light-emitting wavelength of the first light-emitting diodes is greater than 98%.

17. The optical module of claim 1, wherein the optical shell comprises a resin material.

18. The optical module of claim 5, wherein the second light-emitting diodes emit infrared light with a wavelength in a range of 750 to 1400 nm.

19. The optical module of claim 8, wherein in a cross-sectional view, a central axis of the second light-emitting diodes is offset from a central axis of the light guide plates.

20. The optical module of claim 9, wherein each of the dots has a diameter in a range of 10 to 100 um.

* * * * *